H. F. WAITZ.
NONSINKABLE VESSEL.
APPLICATION FILED JULY 13, 1920.
1,428,461.
Patented Sept. 5, 1922.
5 SHEETS—SHEET 2.
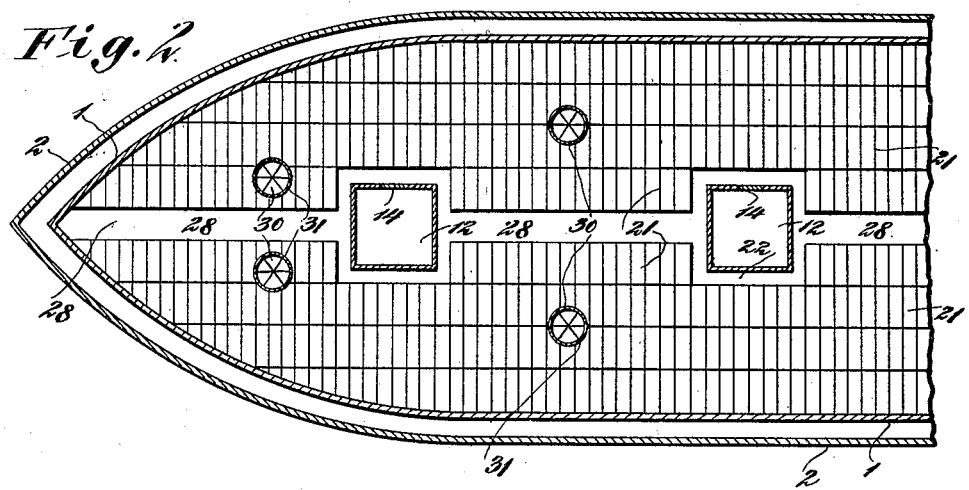
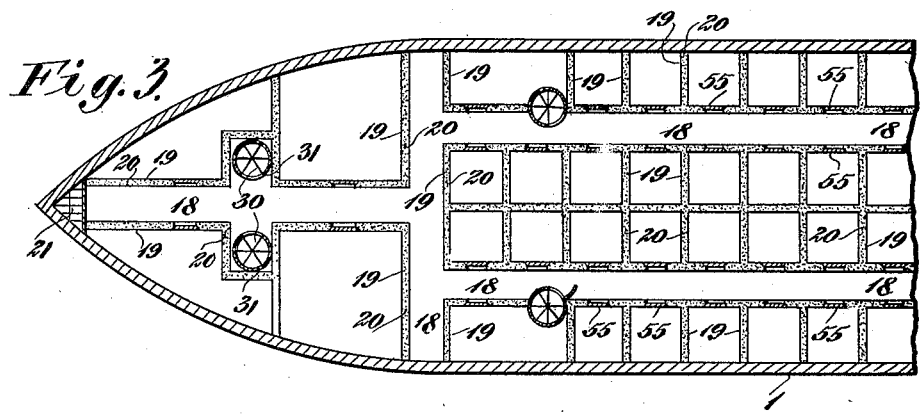
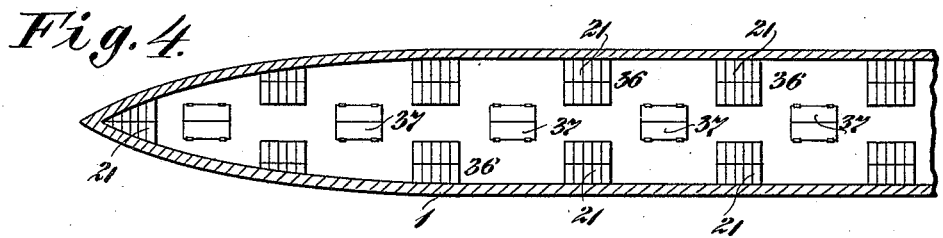
Inventor
Henry F. Waitz.
By his Attorney H. F. WAITZ.
NONSINKABLE VESSEL.
APPLICATION FILED JULY 13, 1920.
1,428,461.
Patented Sept. 5, 1922.
5 SHEETS—SHEET 3.
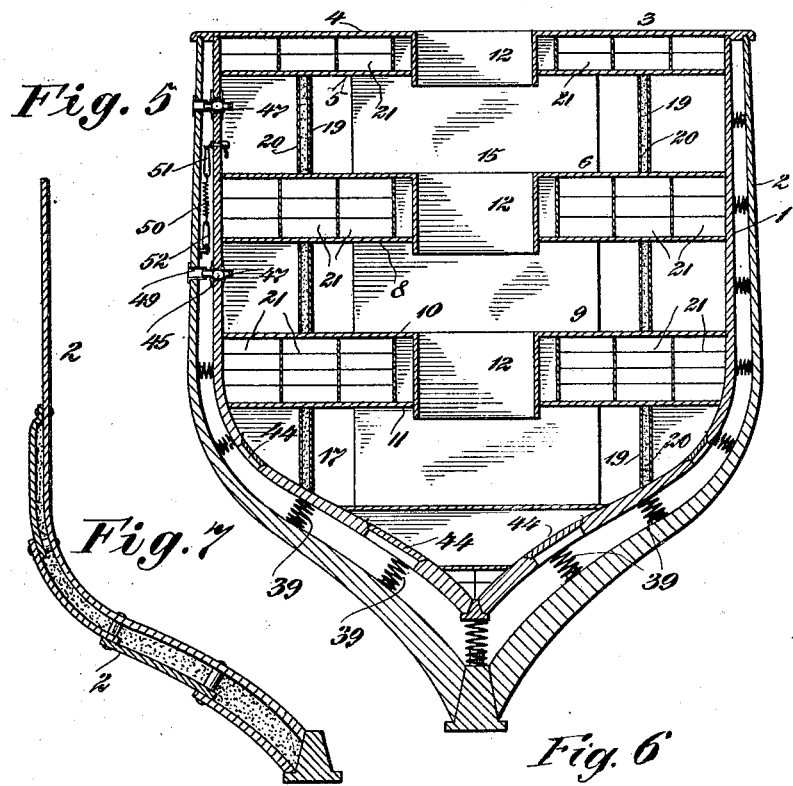
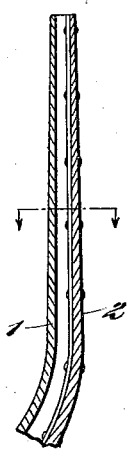
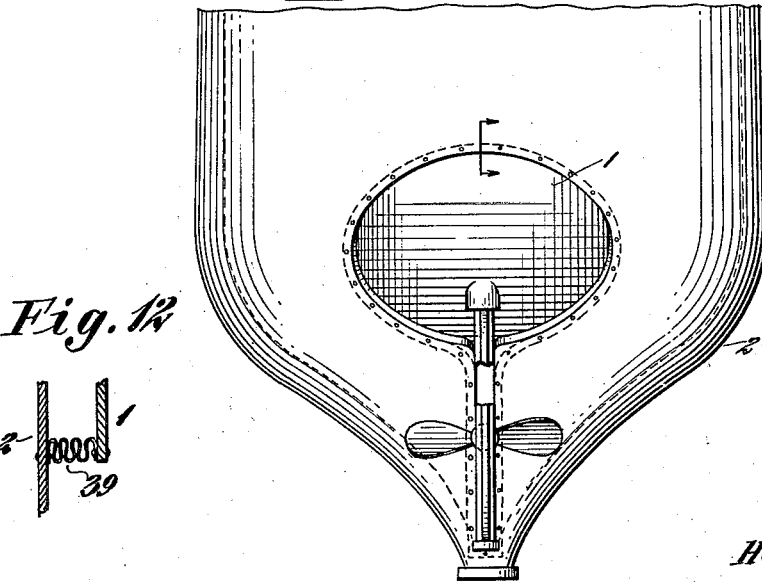
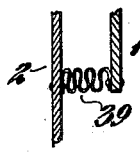
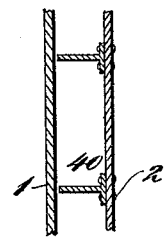
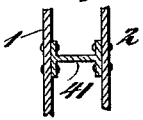
Inventor
Henry F. Waitz.
By his Attorney H. F. WAITZ.
NONSINKABLE VESSEL.
APPLICATION FILED JULY 13, 1920.
1,428,461.
Patented Sept. 5, 1922.
5 SHEETS—SHEET 4.
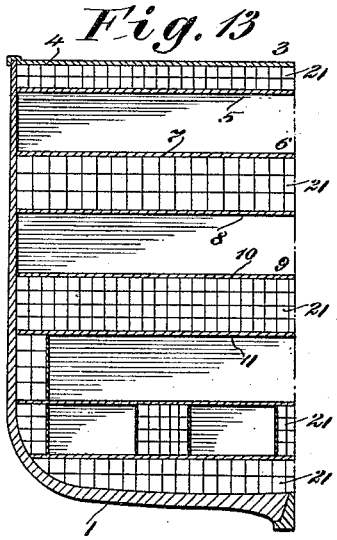
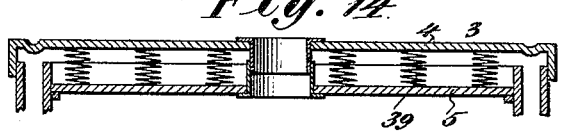
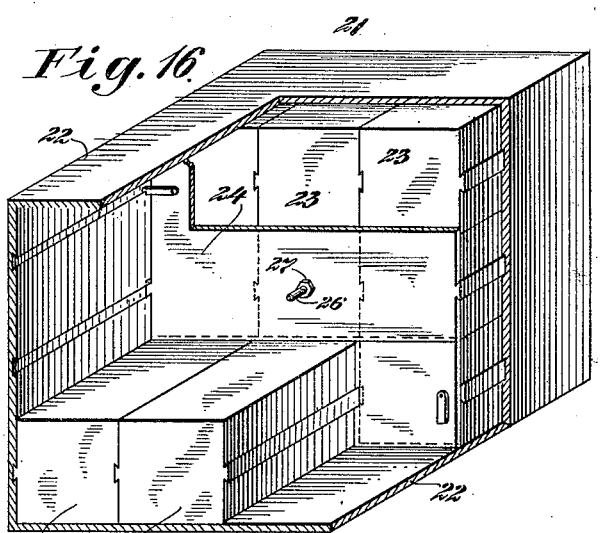
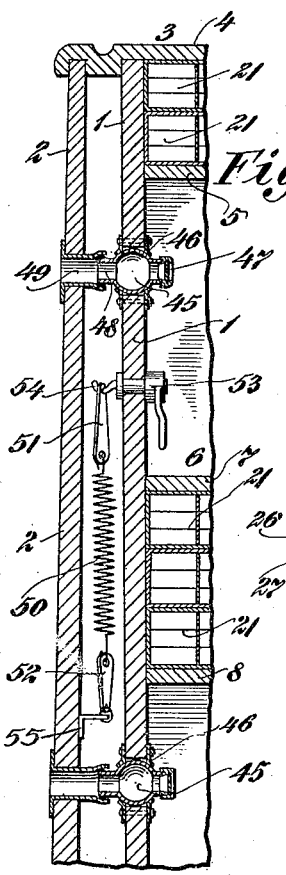
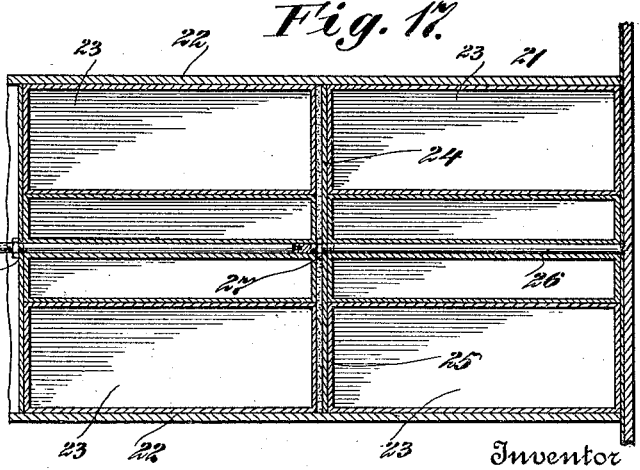
Inventor
Henry F. Waitz.
By his Attorney H. F. WAITZ.
NONSINKABLE VESSEL.
APPLICATION FILED JULY 13, 1920.
1,428,461.
Patented Sept. 5, 1922.
5 SHEETS—SHEET 5.
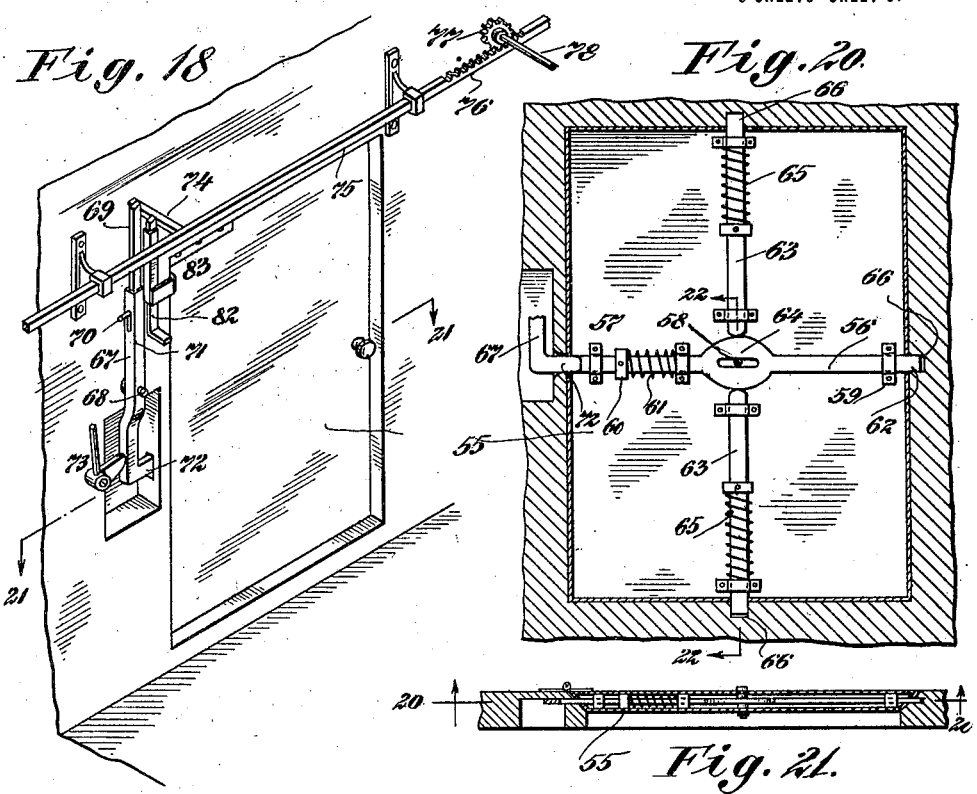
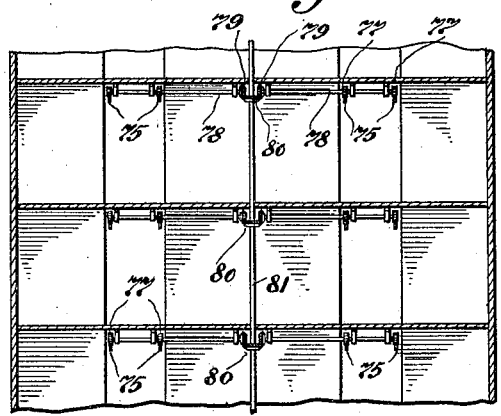
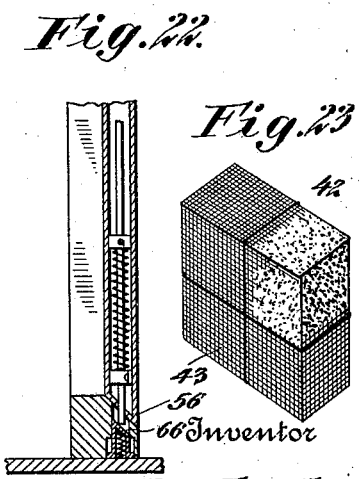
Inventor
Henry F. Waitz.
By his Attorney Patented Sept. 5, 1922.

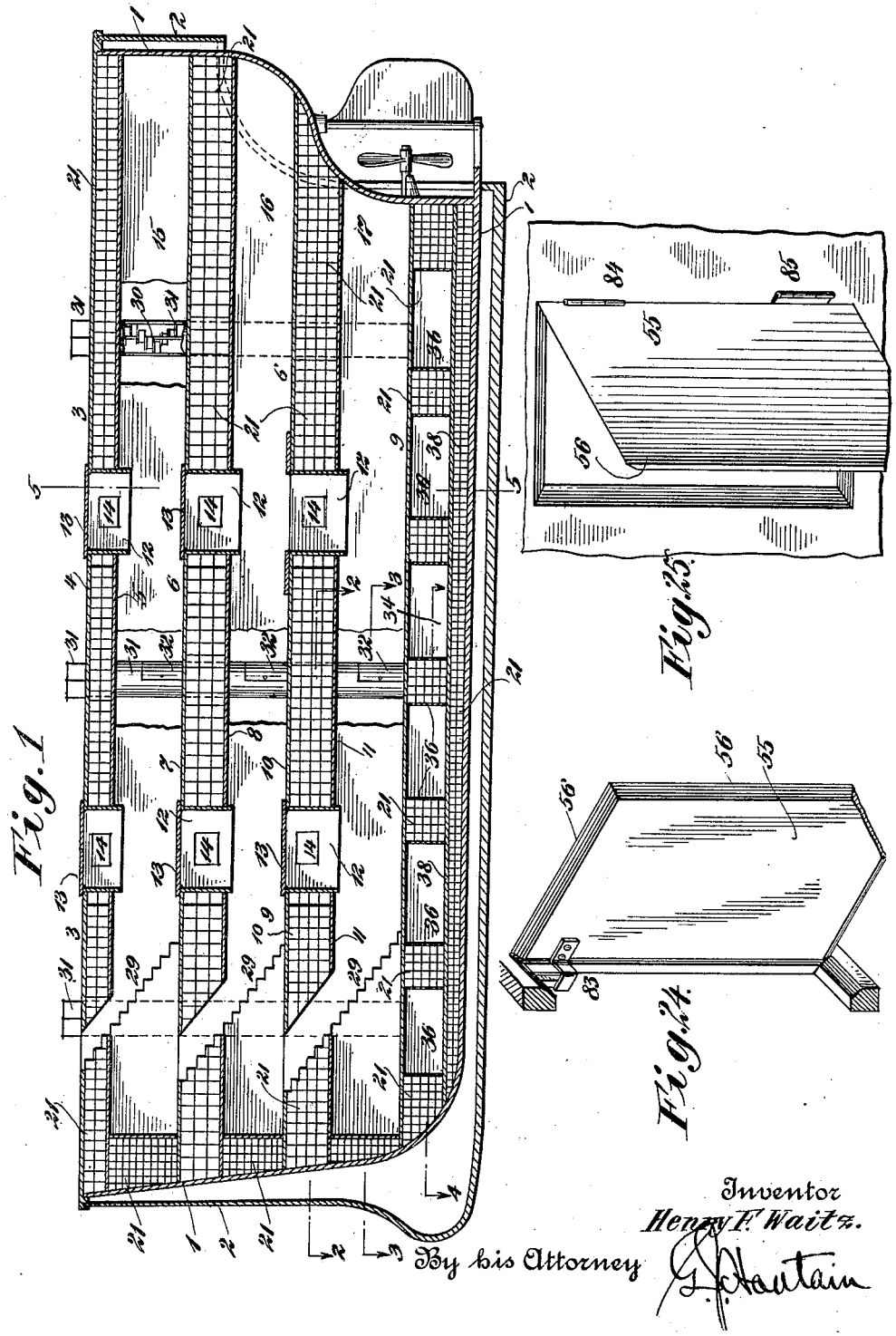

1,428,461

UNITED STATES PATENT OFFICE.

HENRY F. WAITZ, OF NEW YORK, N. Y.

NONSINKABLE VESSEL.

Application filed July 13, 1920. Serial No. 395,914.

*To all whom it may concern:*

Be it known that I, HENRY F. WAITZ, a citizen of the United States, and resident of New York, in the county of New York and State of New York, have invented certain new and useful Improvements in Nonsinkable Vessels, of which the following is a specification.

The present invention relates to boats, more particularly large vessels of the steam ship type, which are employed for cargo and passenger carrying purposes; my improvements, however, may be embodied in boats of any variety whatsover.

The invention has for one of its numerous objects the provision of an absolutely safe, non-sinkable cargo and passenger carrying vessel which is of such novel construction as to be capable of sustaining a maximum of damage and still be maintained afloat, such as hull ruptures caused by collisions with sunken rocks, icebergs or other floating objects. A further object of my invention being to provide a vessel which cannot, in its entirety, be sunk by either shells or torpedoes and which might be rammed, or even cut in half, without liability of having its halved parts sink, their buoyancy being such as to maintain them afloat, whereby passengers could remain on the severed parts until rescued and cargo could, to a considerable extent, be salvaged. However, my principal object is to provide effective means for saving the lives of passengers in the event of the vessel's sustaining any serious damage while at sea.

My invention embodies many novel features of general construction and a unique combination of parts assembled in novel correlation.

Primarily I employ an inner or main hull and an auxiliary outer hull or protective shell therefor, which may be removed and discarded when seriously damaged; cushion or shock absorbing means spacing said hull and shell, as springs, cork or analogous buoyant and elastic material, and means for detachably connecting said bodies; also yielding coupling means interposed between laterally registered port holes of the inner and outer hulls.

The inner or main hull is divided into a plurality of compartments so constructed and arranged that they may be maintained independently closed, water tight and buoyant in the event of injury to adjacent compartments, doors and novel door closing means being employed for keeping out water.

The vessel is further provided with a plurality auxiliary spiral stairways enclosed in tubular air conducting passageways or vents having doorways for ingress and egress of passengers and doors which may be maintained either open or closed.

The several decks of the vessel are double walled and provided with hatchways and doors adapted to be closed, whereby the spaces between decks may be effectually segregated and maintained water tight in the event of injury to adjacent parts of the vessel. The spaces between decks may be subdivided into either cargo carrying or passenger accommodating compartments or state rooms, the latter being separated by means of double walled bulkheads having fillings of buoyant material and air spaces.

The space between the longitudinal walls of each deck is packed and filled with a multiplicity of rectilinear or other adaptably shaped casings or buoyant units containing respectively a plurality of hollow air-containing relatively small sub-units which are removable and interchangeable; parts of the between deck spaces, lower hold and the vessel's bilge also containing such units.

Other novel features of construction are hereinafter fully described and claimed, and disclosed in the example of my invention illustrated by the accompanying drawings forming part of this specification, in which: Figure 1 is a longitudinal sectional view of a vessel embodying my improvements. Fig. 2 is a sectional plan view taken on the line 2—2 of Fig. 1. Fig. 3 is a similar view taken on the line 3—3 of Fig. 1; and Fig. 4 is a sectional plan view taken on the line 4—4 of Fig. 1. Fig. 5 is a vertical sectional view taken on the line 5—5 of Fig. 1. Fig. 6 is an outside elevation of the stern of the vessel; and Figures 7, 8, 9, 10, 11 and 12 are fragmentary cross-sectional views illustrating several means for yieldingly connecting the inner and outer hull members of the vessel. Fig. 13 is a cross section of part of the vessel showing a construction wherein the outer shell is omitted. Fig. 14 is a cross section of the upper deck showing resilient means for spacing its double walls. Fig. 15 is an enlarged cross section showing means for detachably connecting the inner and outer hull members. Fig. 16 is a perspective view, partly broken away, showing one of the buoyant units and the correlation of its enclosed sub-units; and Fig. 17 is a longitudinal sectional view thereof. Fig. 18 is a perspective view illustrating an example of a door adapted for closing the staterooms and means for locking and unlocking said door. Fig. 19 is a sectional plan view showing a means for simultaneously operating said locking means whereby they may be manipulated, in unison, from the engine room or other desirable location. Fig. 20 is a vertical sectional view of one of the stateroom doors taken on the line 20—20 of Fig. 21. Fig. 21 is a cross section taken on the line 21—21 of Fig. 18; and Fig. 22 is a vertical sectional view taken on the line 22—22 of Fig. 20. Fig. 23 is a perspective view of an example of a buoyant unit for spacing the hull members of the vessel; and Figures 24 and 25 are perspective views of the stateroom doors.

In the embodiment of my invention illustrated by the drawings, referring particularly to Figures 1, 2, 3, 4, 5 and 13, 1 indicates the inner or main hull and 2, the outer hull or protective shell of the vessel.

I may employ any suitable number of double walled decks; in the example shown, 3 indicates the upper deck comprising the parallel longitudinal walls 4 and 5. 6 indicates the next lower deck comprising the walls 7 and 8; and 9 indicates a still lower deck comprising the walls 10 and 11. These decks are respectively provided with hatchways 12 having normally closed and fastened upper doors 13 and lateral doors 14 through which the buoyant units, hereinafter described, may be passed.

The spaces 15, 16 and 17, between decks may be divided into any suitable number of compartments, depending upon whether they are to accommodate passengers or contain cargo.

An example of stateroom or passenger-accommodating construction is shown in Fig. 3 of the drawings, wherein I have illustrated a plurality of vari-sized compartments spaced apart by gangways 18 and partitioned by double walled bulkheads 19, which respectively contain a filling of ground cork or other adaptable buoyant material 20.

The space between the longitudinal walls of each of the decks is filled or partly filled with a multiplicity of hollow air-containing buoyant units 21, which respectively comprise an outer casing or shell 22, see Figures 16 and 17 of the drawings, and a plurality of closely packed hollow sub-units 23 which are in dovetailed detachable connection with each other and with the outer casing 22, whereby in the event of one or more of them sustaining damage they may be readily removed and renewed. Said sub-units are divided into separate groups partitioned apart by means of a lateral plate 24 and a cork filling 25, said groups being maintained in rigid attachment by means of bolts and nuts 26 and 27. A longitudinal gangway 28 extends throughout the length of the vessel and around the hatchways 12, whereby access to the buoyant units may be had through the lateral doorways 14 of the hatchways 12, for purposes of assembling, removing or replacing said units.

The between deck spaces 15, 16 and 17 are connected by means of suitable stairways 29; and auxiliary spiral stairways 30 extend vertically through the structure and are encased in cylinders 31 which are suitably vented at the top and have lateral doors 32 which open into the respective between deck spaces to permit of ventilation or use of the stairways 30 when desirable.

Beneath the flooring 33 of the lower space 17 is the hold 34, of the vessel adapted for containing coal bunkers, engines, etc. This hold is provided with a plurality of groups 36, comprising assemblages of buoyant units of the character, hereinabove described; the bilge beneath said hold also being provided with a filling of said buoyant units which may be placed therein through the medium of doors 37 of the flooring 38 of the said hold.

The outer protective shell 2 of the vessel may be either permanently fixed to the hull 1, or it may be in removable engagement therewith; and it may embody a suitable assemblage of overlapped armor plates spaced by a cork filling as shown in Fig. 7, and it is spaced from the hull by any flexible means, as springs 39, yielding cross connections 40, or the rigidly attached T-braces 41. I may also employ buoyant units of ground cork 42, see Fig. 23 of the drawings, encased in a wire mesh 43. As a means for introducing the parts for spacing the shell 2 from the hull 1, I provide suitable doorways through the hull 1 which are normally closed by doors 44, see Fig. 5 of the drawings.

The port holes of the vessel respectively comprise a hollow spherical member 45 and a socket 46. Said sockets being respectively provided with an inner cylindrical extension having a window 47, and an outer cylindrical extension 48 which is in yieldable connection with a cylindrical member 49 of the shell 2, whereby said shell may be disconnected if desired. When this arrangement is used the shell 2 is suspended by means of strong spiral spring hangers 50, having each an upper rod member 51 and a lower rod member 52. The rod 51 engages a hook 54 of a crank 53 which is held normally in position shown in Fig. 15 of the drawings, the lower rod 52 being fixed to a projection 55 of the shell 2. If for any reason it is desired to disconnect the shell 2 from the hull 1 it is simply necessary to swing the crank 53 upwardly until its hook 54 assumes a position with its bill extended downwardly whereby the weight of the shell 2 causes it to drop away from the hull 1. This action would only be resorted to in the event of the shell being injured beyond repair to relieve the vessel of its weight.

The doors 55 for closing the staterooms open outwardly and are respectively two-walled, having beveled edges 56 for close fitting engagement with corresponding beveled bearing surfaces of the door frames, whereby any rush of water from the outside would automatically close the doors.

As a means for locking the doors 55 in closed position they are respectively provided with suitable spring-actuated bolt-means which are enclosed between their outer and inner walls and adapted to be operated, in unison, from the outside and individually from the inside.

In the example of bolt-means illustrated, see Figures 18 to 21 of the drawings, 56 indicates a horizontal bolt which is in slidable engagement with fixed straps 57, 58 and 59 located between the two walls of the door 55. Said bolt is provided with a fixed collar 60, and located between said collar and the strap 58 is a contractile spring 61 whose normal tendency is to maintain the end 62 of said bolt within the door. Vertically extended spring-actuated bolts 63 are also in slidable engagement between the door walls; these bolts bear at their respective inner ends on opposite surfaces of a cam 64, formed integral with the bolt 56, and having a slot 57 which engages a fixed pin 58 to limit its sliding movement. The bolts 63 are respectively spring-actuated by a contractile spring 65 whose normal tendency is to maintain its bolt 63 within the door whereby the door may be opened and closed at will.

As a means for shooting the bolts 56 and 63 into their sockets 66, which are self closing and are formed in the door frame, I provide a lever 67 which swings on a fixed pin 68, said lever 67 having an extensible member 69 which is in slidable engagement therewith by means of a pin 70 which passes through a slot 71 of said lever to limit the movement of said extension; said lever being further provided with a right angle extension 72 for operating the bolt 56.

The lever 67 may be maintained in position for holding the bolts in locked position, shown in Figures 18 and 20 of the drawings, by means of a cam lever 73, whereby a passenger may lock or unlock his door from the inside.

When it is desired to lock the door from a point remote therefrom the extension 69 is moved to the position shown in Fig. 18, whereby it is in the line of travel of and may contact with arm 74 of a sliding rod 75 having a rack 76 which meshes with a pinion 77, of a shaft 78, which is rotated by means of a bevel gear wheel 79 in mesh with a similar bevel gear wheel 80 of a shaft 81 which leads to the engine room, from where it may be rotated to simultaneously close the doors or a series of doors in connection with said gearing, as shown by Fig. 19. The door may further be provided with a vertically slidable stop 82 of a hanger 83 carried by the door which contacts with the door frame to limit the distance which the door may be opened, said door having differential hinges 84, 85 which cause the door to close by its own gravity or by a slight pressure on its outside surface. In the event of the gangways being flooded the weight of the flowing water would close the doors immediately. When it is desired to fully open the door the stop 82 is moved downwardly within its hanger 83 sufficiently to allow it to swing past the door frame.

When the door is locked by means of the arm 74 contacting with the extension 69 of the lever 67, and it is desired to open it from the inside, it is simply necessary to slide the extension 69 downwardly away from contact with the arm 74 and allow the springs 61 and 65 move the bolts 56, 63 inwardly and out of engagement with their sockets, the cam lever 73 being thrown out of engagement with the lever 67.

It is manifest that a boat of the construction hereinabove described embodies many features of safety and utility. The outer cushioned shell acts to thoroughly protect the inner hull from ordinary damages by contact with floating objects, and the buoyancy imparted by the large number of closely packed air-containing units admits of safely carrying a maximum of cargo and many passengers in perfect safety.

In the event of serious injury of such nature as to damage a number of the air units enough adjacent units always remains to keep the vessel afloat, and the novel construction and arrangement admits of segregation of the undamaged parts to prevent the water from entering them.

The removable outer shell admits of repairing the inner hull when the vessel is in dry dock, and it may also be discarded at sea in the event of its becoming so badly damaged as to become useless and a burden to the vessel.

I do not wish to be understood as confining myself to employment of the specific construction and arrangement of parts as hereinabove described, as I believe that I am entitled to employ variations which may rightfully fall under the spirit and scope of my invention.

Having thus described my invention, what I claim as new and desire to secure by Letters Patent, is:

1. A vessel comprising a hull, a protective shell, and means spacing said hull and shell, said vessel having a plurality of double-walled buoyant unit containing decks, a plurality of double-walled buoyant unit containing compartments between decks, and said decks having hatchways leading therethrough which are provided with lateral doors and doorways for passage of said units.

2. A vessel containing a hull, a protective shell spaced from said hull, a plurality of double-walled buoyant unit-containing decks, a plurality of buoyant units located between the walls of said decks, and said decks having hatchways leading therethrough which are provided with lateral doors and doorways for passage of said units.

3. A vessel comprising a hull, a protective shell spaced from said hull, and a plurality of double-walled decks, and a plurality of compartments between said decks, and a plurality of buoyant units contained between the walls of said decks and within said compartments, said vessel having a hold divided into buoyant unit-containing compartments, said decks having hatchways leading therethrough which are provided with lateral doors and doorways for passage of said units.

4. A vessel comprising a hull, a protective shell spaced from said hull, a plurality of double-walled buoyant unit containing decks, and a plurality of buoyant unit containing compartments between decks said vessel having a hold containing a plurality of sets of buoyant units, and a bilge beneath hold and a plurality of buoyant units within said bilge, and said decks having hatchways leading therethrough which are provided with lateral doors and doorways for passage of said units.

5. A vessel comprising a hull, a protective shell, and means spacing said hull and shell, said vessel having double-walled decks, and a plurality of buoyant units spacing said double-walled decks, said decks having hatchways leading therethrough which are provided with lateral doors and doorways for passage of said units, said units so assembled as to make gangways which lead to said lateral doorways.

Signed at New York, in the county of New York and State of New York, this seventeenth day of June A. D. 1920.

HENRY F. WAITZ.